(No Model.)
W. WHARTON, Jr., & E. SAMUEL.
CABLE RAILWAY.
No. 315,985. Patented Apr. 14, 1885.
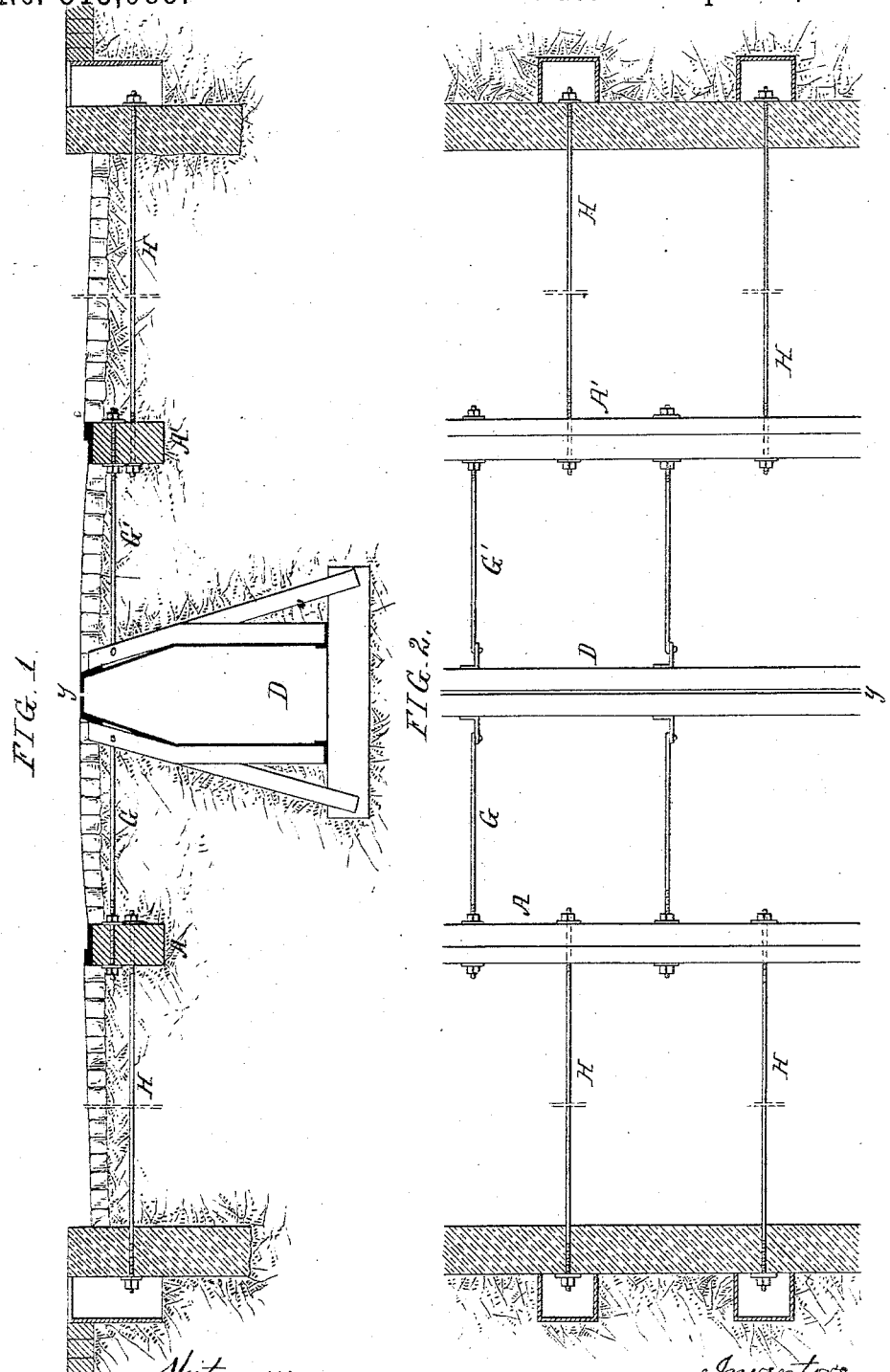
Witnesses
E. A. Happersett
Harry Smith
Inventors
William Wharton Jr
and Edward Samuel,
by their Attorneys
Howson & Sons

UNITED STATES PATENT OFFICE.

WILLIAM WHARTON, JR., AND EDWARD SAMUEL, OF PHILADELPHIA, PENNSYLVANIA, ASSIGNORS TO WILLIAM WHARTON, JR., & CO., (LIMITED,) OF SAME PLACE.

CABLE RAILWAY.

SPECIFICATION forming part of Letters Patent No. 315,985, dated April 14, 1885.

Application filed February 3, 1885. (No model.)

*To all whom it may concern:*

Be it known that we, WILLIAM WHARTON, Jr., and EDWARD SAMUEL, both citizens of the United States, and residents of Philadelphia, Pennsylvania, have invented certain Improvements in Cable Railways, of which the following is a specification.

Our invention consists of the combination of the conduit and sills of a cable road and stay-rods for connecting the conduits to the sills, with rods whereby the sills are anchored to the roadway, the invention being fully described and claimed, and its objects set forth hereinafter.

In the accompanying drawings, Figure 1 is a vertical section of a cable road made in accordance with our invention, and Fig. 2 a plan view.

A and A' are the longitudinal sills of the track, and D the conduit, which in the present instance is made in accordance with Patent No. 287,220, granted to A. Bonzano, October 23, 1883. One side of the conduit is connected to the sill A by a series of stay-rods, G, and the opposite side of the conduit by similar rods, G', to the sill A', as in the Letters Patent No. 281,593, granted to Wm. Wharton, Jr., July 17, 1883.

It is important in cable roads that the slot y in the top of the conduit should be maintained at a uniform width, and the stay-rods in the said patent have this tendency; but it was found in applying the rods to the conduits of this class that the slot of the conduit would be contracted during a frost, the sills being more or less displaced. In order to obviate this difficulty, we connect to each sill a stay-rod, H, which is anchored at its outer end to any part of the road-bed.

In Fig. 1 the rods are anchored to the curbstones in the manner described in a separate application for patent filed by us, the said application being lettered "C," and bearing even date herewith. The rods shown in the application are connected directly to the conduit and independent of the sills.

It is not necessary to anchor the rods H H to the curbstones. Indeed, there are many instances in which there are no curbstones to afford an anchorage. The rods, for instance, may be inclined and anchored to blocks embedded in the soil below the pavement, as described in the aforesaid application "C."

When adjustable in length, we prefer to pass the threaded ends of the said rods G through the sills, and to furnish such rod with a nut on each side of the sill, as shown in the drawings. We do not, however, desire to restrict ourselves to any specific mode of connecting the rods G G' to the conduit or sills. They may, for instance, be adjustably connected to the conduit and permanently attached to the sills, or such rods may be made in two sections connected together by the ordinary right-and-left-hand screw-coupling.

We claim as our invention—

1. The combination of the sills and conduits of a cable road and stay-rods G G', with stay-rods H, connected to the said sills and anchored to the roadway, substantially as set forth.

2. The combination of the sills and conduit of a cable road, with adjustable stay-rods G G', connecting the conduit to the sills, and rods H connected to the sills and anchored to the roadway, substantially as specified.

In testimony whereof we have signed our names to this specification in the presence of two subscribing witnesses.

WM. WHARTON, JR.
EDWD. SAMUEL.

Witnesses:
HENRY HOWSON, Jr.,
HARRY SMITH.